United States Patent
Qiu (10) Patent No.: US 12,144,321 B2
(45) Date of Patent: Nov. 19, 2024

(54) CONVENIENT PET BRUSH FOR HAIR REMOVAL

(71) Applicant: JIANGSU ZHONGHENG PET ARTICLES JOINT-STOCK CO., LTD., Yancheng (CN)

(72) Inventor: Bin Qiu, Yancheng (CN)

(73) Assignee: JIANGSU ZHONGHENG PET ARTICLES JOINT-STOCK CO., LTD., Yancheng (CN)

( * ) Notice: Subject to any disclaimer, the term of this patent is extended or adjusted under 35 U.S.C. 154(b) by 46 days.

(21) Appl. No.: 18/155,793

(22) Filed: Jan. 18, 2023

(65) Prior Publication Data
US 2024/0016120 A1 Jan. 18, 2024

(30) Foreign Application Priority Data
Jul. 13, 2022 (CN) .......................... 202221796233.3

(51) Int. Cl.
*A01K 13/00* (2006.01)
*A46B 5/00* (2006.01)
*A46B 15/00* (2006.01)

(52) U.S. Cl.
CPC .............. *A01K 13/002* (2013.01); *A46B 5/00* (2013.01); *A46B 15/00* (2013.01); *A46B 2200/1093* (2013.01)

(58) Field of Classification Search
CPC ........ A01K 13/002; A46B 5/00; A46B 15/00; A46B 2200/1093; A46B 17/06
See application file for complete search history.

(56) References Cited

U.S. PATENT DOCUMENTS

| | | | |
|---|---|---|---|
| 5,823,145 A * | 10/1998 | Hingiss ................ | A01K 13/002 119/603 |
| 7,225,815 B2 * | 6/2007 | Kung ..................... | A46B 17/06 132/119 |
| 8,082,887 B2 * | 12/2011 | Fernandez ........... | A01K 13/002 119/664 |
| 10,492,467 B2 * | 12/2019 | Harris, II ............... | A46B 9/023 |

(Continued)

OTHER PUBLICATIONS

Furminator, "Undercoat deShedding Tool Large Dog Long Hair", Jun. 16, 2021, https://www.furminator.com/products/deshed/dog/undercoat-deshedding-tool-large-dog-long-hair.aspx (Year: 2021).*

*Primary Examiner* — Tien Q Dinh
*Assistant Examiner* — William L Gmoser
(74) *Attorney, Agent, or Firm* — Bayramoglu Law Offices LLC (57) ABSTRACT

A convenient pet brush for hair removal includes a handle, a housing, and a brush assembly. The housing is arranged at a lower end of the handle. The brush assembly is arranged inside the housing. A bayonet shrinking inward is provided on a first side of the housing. A front fixing ring is arranged on an inner side of the bayonet. A rear fixing ring is arranged on a second side of the housing. The brush assembly is mounted inside the housing through the front fixing ring and the rear fixing ring. The brush assembly includes a comb head, a push plate, and a spring. The comb head is fixedly mounted in the front fixing ring. The push plate is slidably mounted between the front fixing ring and the comb head. A hair pushing ring is provided at a first end of the push plate.

8 Claims, 7 Drawing Sheets

(56) References Cited

U.S. PATENT DOCUMENTS

| | | | |
|---|---|---|---|
| 10,694,719 B2 * | 6/2020 | Johnson | A01K 13/001 |
| D932,714 S * | 10/2021 | Favia | D30/159 |
| D1,022,477 S * | 4/2024 | Yan | D30/158 |
| 2009/0126648 A1 * | 5/2009 | Porter | A01K 13/00 |
| | | | 119/601 |
| 2020/0060231 A1 * | 2/2020 | Lin | A01K 13/002 |
| 2022/0279756 A1 * | 9/2022 | Zhang | A01K 13/002 |
| 2022/0386565 A1 * | 12/2022 | Pan | A01K 13/002 |
| 2023/0180715 A1 * | 6/2023 | Zhang | A45D 24/08 |
| | | | 119/633 |

\* cited by examiner

CONVENIENT PET BRUSH FOR HAIR REMOVAL

CROSS REFERENCE TO THE RELATED APPLICATIONS

This application claims priority based on Chinese patent application No. 202221796233.3 filed on Jul. 13, 2022, the entire contents of which are hereby incorporated by reference.

TECHNICAL FIELD

The present disclosure belongs to the technical field of pet products, and in particular relates to a convenient pet brush for hair removal.

BACKGROUND

In the process of pet keeping, special attention should be paid to cleanliness and hygiene. Regular bathing, brushing and grooming of pets can not only maintain the hygiene of the pets, but also keep the pets looking good. It is indispensable to take care of pet hair in the process of pet bathing, brushing and grooming. As a pet product, pet brushes are mainly used to comb the hair of pets, and collect and dispose loose hairs of the pets, preventing the pet hairs from scattering everywhere. During the use of the existing pet brushes, pet hairs are often stuck between the comb teeth. It is necessary to remove pet hairs from the comb teeth by hand from time to time, which leads to a poor use experience of the pet brushes and affects the usage effect of the pet brushes. In order to solve this problem, some brushes are additionally provided with a hair removal board on one side. However, because structures such as the hair removal board cannot collect hairs, loose hairs of pets are likely to be left everywhere, and the actual usage effect is not desirable.

SUMMARY

An objective of the present disclosure is to overcome the deficiencies in the prior art and provide a convenient easy-to-clean pet brush for hair removal with a good hair removal effect.

To solve the above technical problems, the following technical solutions are employed in the present disclosure.

A convenient pet brush for hair removal is provided, including a handle, a housing, and a brush assembly. The housing is arranged at a lower end of the handle. The brush assembly is arranged inside the housing. A bayonet shrinking inward is provided on a first side of the housing. A front fixing ring is arranged on an inner side of the bayonet. A rear fixing ring is arranged on a second side of the housing. The brush assembly is mounted inside the housing through the front fixing ring and the rear fixing ring. The brush assembly includes a comb head, a push plate, and a spring. The comb head is fixedly mounted in the front fixing ring. The push plate is slidably mounted between the front fixing ring and the comb head. A hair pushing ring is provided at a first end of the push plate. The hair pushing ring is sleeved on an outer side of the comb head. A press plate is provided at a second end of the push plate. The press plate extends through the rear fixing ring and is configured to be slidable in the rear fixing ring. The spring is arranged between the press plate and the front fixing ring.

Preferably, the front fixing ring includes an upper fixing plate and a lower fixing plate, annular protrusions are arranged on a lower surface of the upper fixing plate, fixing columns configured for engagement with the annular protrusions are arranged on the lower fixing plate, mounting holes configured for engagement with the fixing columns are arranged on the comb head, the comb head is mounted on the lower fixing plate by the engagement of the mounting holes with the fixing columns, and a lower surface of each of the annular protrusions abuts against an upper surface of the comb head.

Preferably, slotted holes configured for engagement with the annular protrusions are provided on the push plate, and the push plate is slidably mounted between the upper surface of the comb head and the lower fixing plate by the engagement of the slotted holes with the annular protrusions.

Preferably, a support column is arranged on a side wall of the press plate facing the front fixing ring, a first end of the spring is sleeved on the support column, and a second end of the spring abuts against the front fixing ring.

Preferably, connecting blocks protruding downward are respectively arranged at two ends of the upper fixing plate, and connecting grooves configured for engagement with the connecting blocks are respectively provided at two ends of the lower fixing plate.

Preferably, mounting strips are respectively arranged on two side walls in the housing, and engagement grooves corresponding to the mounting strips are provided on the rear fixing ring.

Preferably, limiting strips are respectively arranged on two side walls in the housing.

Preferably, a positioning strip is arranged on a bottom surface in the housing, and a positioning groove configured for engagement with the positioning strip is provided on the lower fixing plate.

Preferably, a plug is arranged at an upper end of the handle.

Compared with the prior art, the present disclosure has the following advantages.

With the design of the hair pushing ring adopted in the present disclosure, the pet hairs stuck in the comb head can be easily removed during the use of the pet brush, and the removed pet hairs can be directly disposed into a trash can, without being scattered all over the house, thereby improving the use experience of the pet brush. The present disclosure has a simple structure, and is convenient to operate, and the pet brush of the present disclosure can be directly rinsed with clean water after use.

IN THE DRAWINGS

1. handle; 2. housing; 3. bayonet; 4. front fixing ring; 5. rear fixing ring; 6. comb head; 7. push plate; 8. spring; 9.

upper fixing plate; 10. lower fixing plate; 11. annular protrusion; 12. fixing column; 13. mounting hole; 14. slotted hole; 15. support column; 16. connecting block; 17. connecting groove; 18. mounting strip; 20. limiting strip; 21. positioning strip; 22. positioning groove; 23. plug; 24. hair pushing ring; 25. press plate.

DETAILED DESCRIPTION OF THE EMBODIMENTS

In order to enable those skilled in the art to better understand the solutions of the present disclosure, the technical solutions in the embodiments of the present disclosure will be described clearly and fully with reference to the accompanying drawings in the embodiments of the present disclosure.

As shown in FIG. 1 to FIG. 7, a convenient pet brush for hair removal includes a handle 1, a housing 2, and a brush assembly. The housing 2 is arranged at a lower end of the handle 1. The brush assembly is arranged inside the housing 2. A bayonet 3 shrinking inward is provided on a first side of the housing 2. A front fixing ring 4 is arranged on an inner side of the bayonet 3. The bayonet 3 can prevent the front fixing ring 4 from moving forward.

A rear fixing ring 5 is arranged on a second side of the housing 2. The brush assembly is mounted inside the housing 2 through the front fixing ring 4 and the rear fixing ring 5. The brush assembly includes a comb head 6, a push plate 7, and a spring 8. The comb head 6 is fixedly mounted in the front fixing ring 4. The push plate 7 is slidably mounted between the front fixing ring 4 and the comb head 6. A hair pushing ring 24 is provided at a first end of the push plate 7. The hair pushing ring 24 is configured to push out the pet hairs stuck between comb teeth of the comb head 6. The hair pushing ring 24 is sleeved on an outer side of the comb head 6. A press plate 25 is provided at a second end of the push plate 7. The press plate 25 extends through the rear fixing ring 5 and is configured to be slidable in the rear fixing ring 5. The rear fixing ring 5 provides a supporting function for the press plate 25. The spring 8 is arranged between the press plate 25 and the front fixing ring 4. The spring 8 provides the press plate 25 with a force to move rearward away from the front fixing ring 4.

Figure 3:
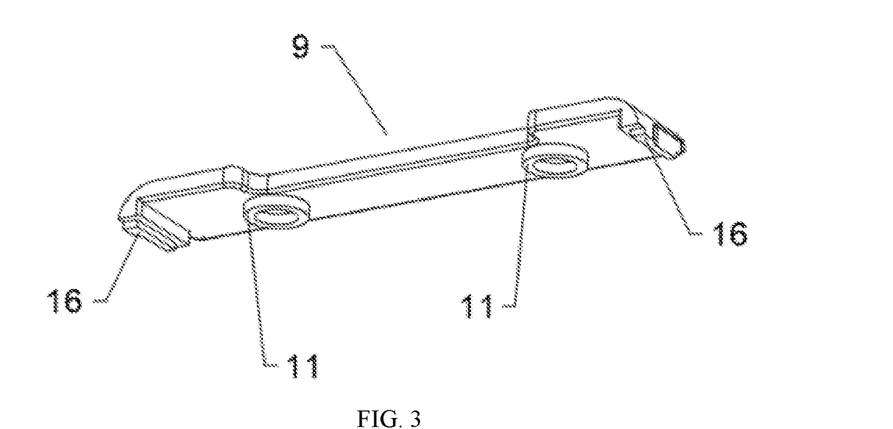
FIG. 3 is a schematic structural view of an upper fixing plate of the present disclosure.
Figure 4:
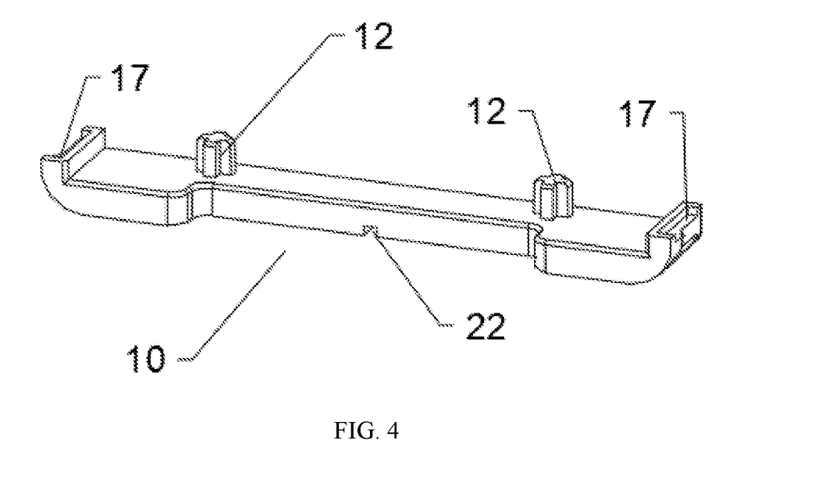
FIG. 4 is a schematic structural view of a lower fixing plate of the present disclosure.
Figure 5:
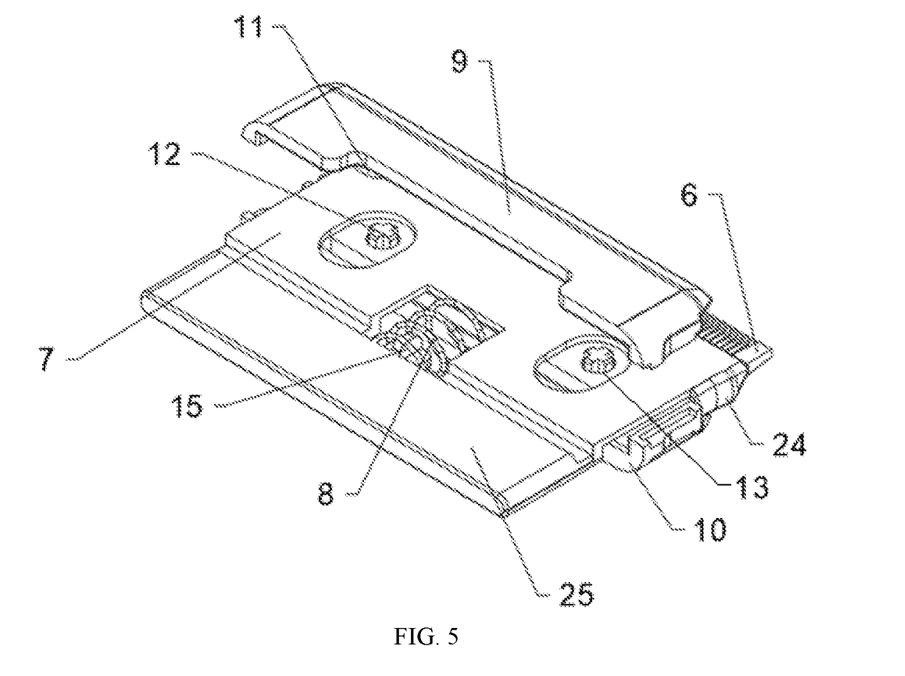
FIG. 5 is a schematic view showing mounting of a front fixing ring, a push plate and a comb head of the present disclosure.

Further, the front fixing ring 4 includes an upper fixing plate 9 and a lower fixing plate 10. Annular protrusions 11 are arranged on a lower surface of the upper fixing plate 9. Fixing columns 12 configured for engagement with the annular protrusions 11 are arranged on the lower fixing plate 10. An end of each of the fixing columns 12 can be inserted into a respective one of the annular protrusions 11. Mounting holes 13 configured for engagement with the fixing columns 12 are arranged on the comb head 6. The comb head 6 is mounted on the lower fixing plate 10 by the engagement of the mounting holes 13 with the fixing columns 12. A lower surface of each of the annular protrusions 11 abuts against an upper surface of the comb head 6. A height for mounting the push plate 7 is reserved between the comb head 6 and the upper fixing plate 9.

Figure 6:
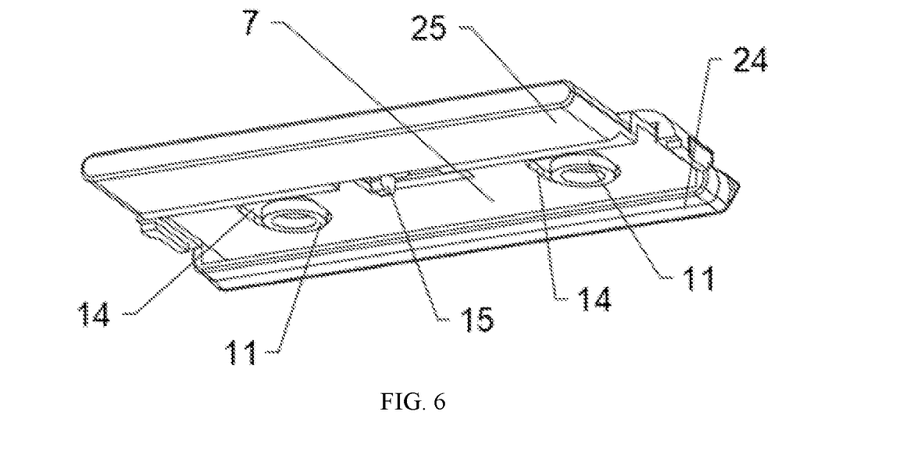
FIG. 6 is a schematic view showing mounting of the upper fixing plate and the push plate of the present disclosure.
Figure 7:
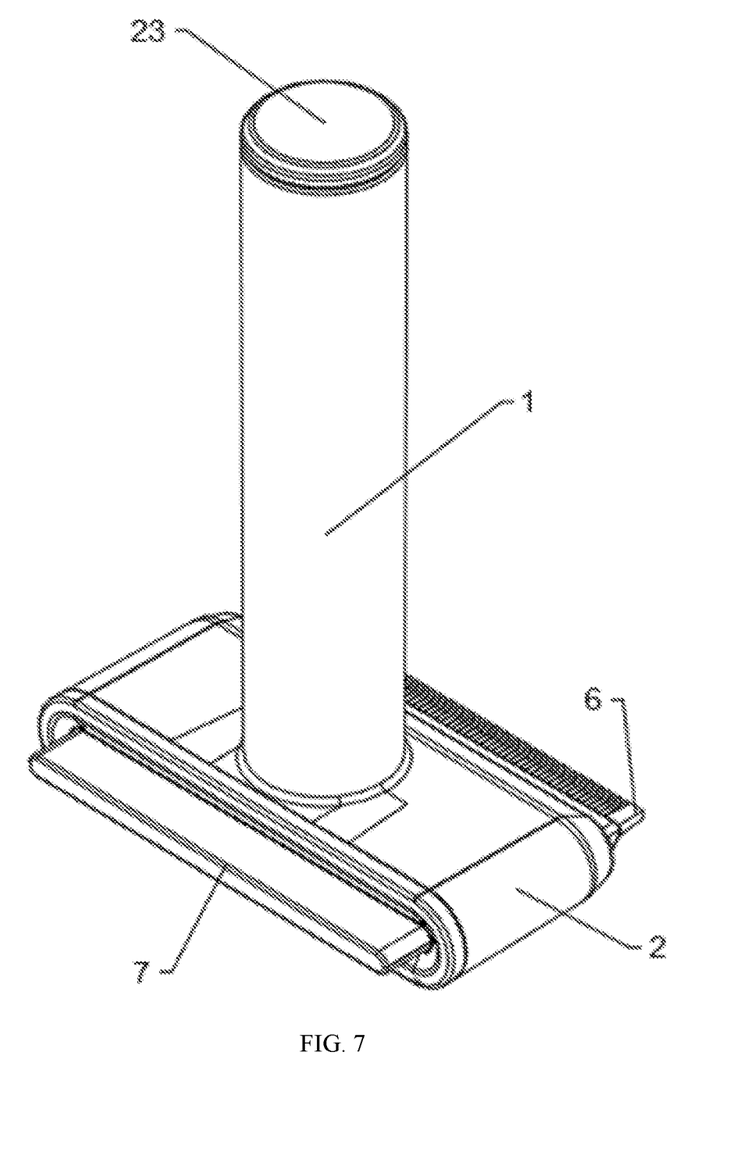
FIG. 7 is a view showing an external contour of the present disclosure.

Further, slotted holes 14 configured for engagement with the annular protrusions 11 are provided on the push plate 7, and the push plate 7 is slidably mounted between the upper surface of the comb head 6 and the lower fixing plate 10 by the engagement of the slotted holes 14 with the annular protrusions 11.

Figure 1:
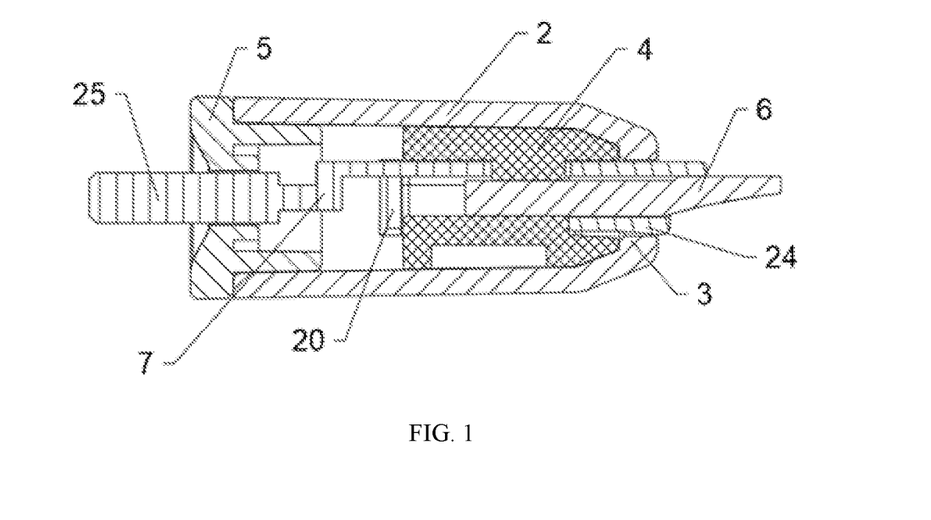
FIG. 1 is a schematic structural view of an interior of a housing of the present disclosure.

Further, a support column 15 is arranged on a side wall of the press plate 25 facing the front fixing ring 4. A first end of the spring 8 is sleeved on the support column 15. The support column 15 provides a supporting and fixing function for the spring 8, so that the spring 8 does not detach from the press plate 25. A second end of the spring 8 abuts against the front fixing ring 4, so that there is a certain distance between the spring 8 and the front fixing ring 4.

Further, connecting blocks 16 protruding downward are respectively arranged at two ends of the upper fixing plate 9, and connecting grooves 17 configured for engagement with the connecting blocks 16 are respectively provided at two ends of the lower fixing plate 10. The engagement of the connecting blocks 16 with the connecting grooves 17 prevents misalignment of the upper fixing plate 9 and the lower fixing plate 10, facilitating the assembly.

Further, mounting strips 18 are respectively arranged on two side walls in the housing 2, and engagement grooves corresponding to the mounting strips 18 are provided on the rear fixing ring 5. The rear fixing ring 5 is mounted in the housing 2 by engagement of the mounting strips 18 with the engagement grooves.

Further, limiting strips 20 are respectively arranged on two side walls in the housing 2. The limiting strips 20 are configured for restricting an axial movement of the front fixing ring 4, i.e., restricting the comb head 6 from moving rearward.

Further, a positioning strip 21 is arranged on a bottom surface in the housing 2, and a positioning groove 22 configured for engagement with the positioning strip 21 is provided on the lower fixing plate 10. The lower fixing plate 10 can be accurately mounted in the housing 2 by the engagement of the positioning strip 21 with the positioning groove 22.

Figure 2:
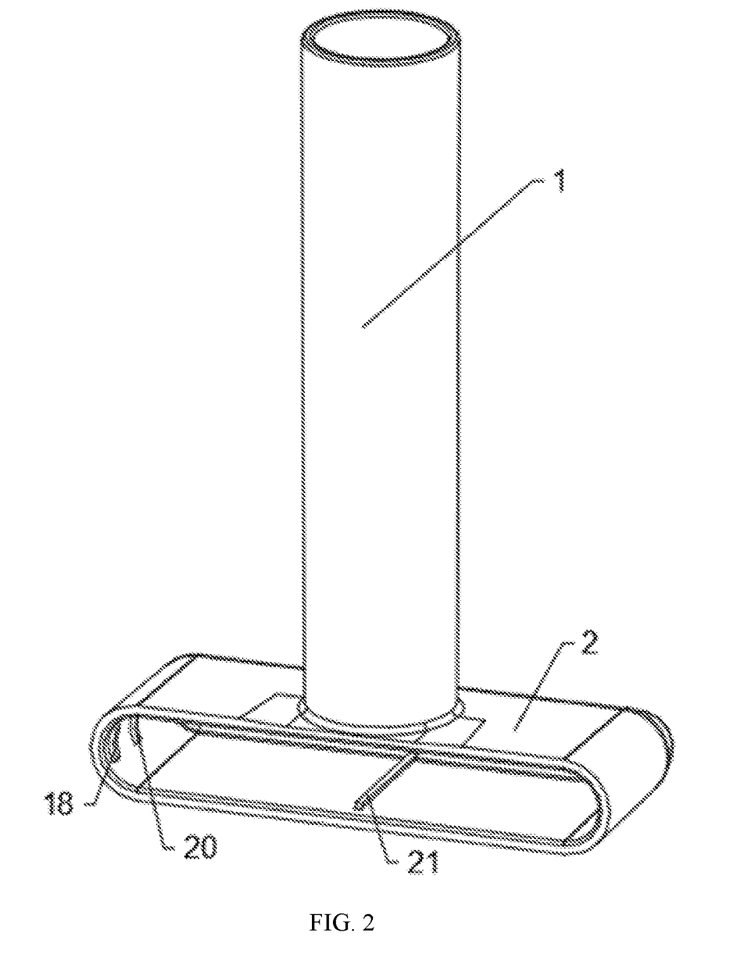
FIG. 2 is a schematic structural view of a handle and the housing of the present disclosure.

Further, a plug 23 is arranged at an upper end of the handle 1. The plug 23 prevents foreign objects from entering into the handle 1.

Working principles: When combing the pet hair, the user holds the handle 1, and combs the pet hair along the texture of the pet hair with the comb head 6. During the combing process, when finding that the pet hairs are stuck in the comb head 6, the user presses the press plate 25 with a finger, to cause the press plate 25 to move forward along an inner rim of the rear fixing ring 5. In this case, the press plate 25 pushes the push plate 7 to move forward. When moving forward, the hair pushing ring 14 at the front end of the push plate 7 drives the pet hairs on the comb head 6 to move forward until the pet hairs are detached from the comb head 6. After the user release the finger, the press plate 25 is reset backward under an elastic force of the spring 8. Then, the user can continue combing the pet hair.

It should be understood that the above embodiments are only example embodiments for illustrating the principles of the present disclosure, but the present disclosure is not limited thereto. Those having ordinary skill in the art can make various changes and modifications without departing from the spirit and scope of the present disclosure. Such changes and modifications also fall within the protection scope of the present disclosure.

What is claimed is:

1. A convenient pet brush for hair removal, comprising a handle, a housing arranged at a lower end of the handle, a brush assembly arranged inside the housing, a plurality of annular protrusions, a plurality of fixing columns, and a plurality of mounting holes, wherein a bayonet shrinking inward is provided on a first side of the housing, a front fixing ring is arranged on an inner side of the bayonet, a rear fixing ring is arranged on a second side of the housing, and the brush assembly is mounted inside the housing through the front fixing ring and the rear fixing ring;

the brush assembly comprises a comb head, a push plate, and a spring, wherein the comb head is fixedly mounted in the front fixing ring, the push plate is slidably mounted between the front fixing ring and the comb head, a hair pushing ring is provided at a first end of the push plate, the hair pushing ring is sleeved on an outer side of the comb head, a press plate is provided at a second end of the push plate, and the press plate extends through the rear fixing ring and is configured to be slidable in the rear fixing ring; and the spring is arranged between the press plate and the front fixing ring, and wherein the front fixing ring comprises an upper fixing plate and a lower fixing plate, wherein the plurality of annular protrusions are arranged on a lower surface of the upper fixing plate, the plurality of fixing columns are configured for engagement with the plurality of annular protrusions and are arranged on the lower fixing plate, the plurality of mounting holes are configured for engagement with the plurality of fixing columns and are arranged on the comb head, the comb head is mounted on the lower fixing plate by the engagement of the plurality of mounting holes with the plurality of fixing columns, and a lower surface of each of the plurality of annular protrusions abuts against an upper surface of the comb head.

2. The convenient pet brush for hair removal according to claim 1, further comprising a plurality of slotted holes, wherein the plurality of slotted holes are configured for engagement with the plurality of annular protrusions and are provided on the push plate, and the push plate is slidably mounted between the upper surface of the comb head and the lower fixing plate by the engagement of the plurality of slotted holes with the plurality of annular protrusions.

3. The convenient pet brush for hair removal according to claim 1, further comprising a support column, wherein the support column is arranged on a side wall of the press plate facing the front fixing ring, a first end of the spring is sleeved on the support column, and a second end of the spring abuts against the front fixing ring.

4. The convenient pet brush for hair removal according to claim 1, further comprising a plurality of connecting blocks and a plurality of connecting grooves, wherein the plurality of connecting blocks protrude downward and are respectively arranged at two ends of the upper fixing plate, and the plurality of connecting grooves are configured for engagement with the plurality of connecting blocks and are respectively provided at two ends of the lower fixing plate.

5. The convenient pet brush for hair removal according to claim 1, further comprising a plurality of limiting strips, wherein the plurality of limiting strips are respectively arranged on two side walls in the housing.

6. The convenient pet brush for hair removal according to claim 1, further comprising a positioning strip and a positioning groove, wherein the positioning strip is arranged on a bottom surface in the housing, and the positioning groove is configured for engagement with the positioning strip and is provided on the lower fixing plate.

7. The convenient pet brush for hair removal according to claim 1, further comprising a plug, wherein the plug is arranged at an upper end of the handle.

8. A convenient pet brush for hair removal, comprising a handle, a housing arranged at a lower end of the handle, a brush assembly arranged inside the housing, a plurality of mounting strips and a plurality of engagement grooves, wherein a bayonet shrinking inward is provided on a first side of the housing, a front fixing ring is arranged on an inner side of the bayonet, a rear fixing ring is arranged on a second side of the housing, and the brush assembly is mounted inside the housing through the front fixing ring and the rear fixing ring;

the brush assembly comprises a comb head, a push plate, and a spring, wherein the comb head is fixedly mounted in the front fixing ring, the push plate is slidably mounted between the front fixing ring and the comb head, a hair pushing ring is provided at a first end of the push plate, the hair pushing ring is sleeved on an outer side of the comb head, a press plate is provided at a second end of the push plate, and the press plate extends through the rear fixing ring and is configured to be slidable in the rear fixing ring; and the spring is arranged between the press plate and the front fixing ring, and wherein the plurality of mounting strips are respectively arranged on two side walls in the housing, and the plurality of engagement grooves correspond to the plurality of mounting strips and are provided on the rear fixing ring.

\* \* \* \* \*